(12) United States Patent
Garcia Ramirez et al.

(10) Patent No.: US 10,710,600 B2
(45) Date of Patent: Jul. 14, 2020

(54) APPARATUS AND METHOD FOR PROVIDING CLIMATE AND COMFORT CONTROL WHILE OPTIMIZING THE FUEL ECONOMY OF A MOTOR VEHICLE

(71) Applicant: FORD GLOBAL TECHNOLOGIES, LLC, Dearborn, MI (US)

(72) Inventors: Arturo Alberto Garcia Ramirez, Mexico City (MX); Ricardo Aramis Jimenez Villagran, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/184,433

(22) Filed: Nov. 8, 2018

(65) Prior Publication Data

US 2020/0148216 A1    May 14, 2020

(51) Int. Cl.
  *B60W 50/00* (2006.01)
  *B60H 1/00* (2006.01)
  *B60R 16/037* (2006.01)
  *B60R 16/023* (2006.01)
  *G01C 21/34* (2006.01)
  *B60W 50/14* (2020.01)

(52) U.S. Cl.
  CPC ..... *B60W 50/0098* (2013.01); *B60H 1/00642* (2013.01); *B60R 16/0236* (2013.01); *B60R 16/037* (2013.01); *B60W 50/14* (2013.01); *G01C 21/3469* (2013.01); *B60W 2530/00* (2013.01); *B60W 2540/00* (2013.01); *B60W 2900/00* (2013.01)

(58) Field of Classification Search
  CPC ............. B60W 50/0098; B60W 50/14; B60W 2540/00; B60W 2560/00; B60W 2900/00; B60H 1/00642; B60R 16/0236; B60R 16/037; G01C 21/3469
  See application file for complete search history.

(56) References Cited

U.S. PATENT DOCUMENTS

| | | | |
|---|---|---|---|
| 7,490,000 | B2 | 2/2009 | Siddiqui et al. |
| 7,765,058 | B2 | 7/2010 | Doering |
| 8,442,752 | B2 | 5/2013 | Wijaya et al. |
| 8,576,057 | B2 | 11/2013 | Sekiyama et al. |
| 9,416,987 | B2 | 8/2016 | Ragland et al. |
| 9,579,949 | B2 | 2/2017 | Patel |

(Continued)

FOREIGN PATENT DOCUMENTS

| | | |
|---|---|---|
| JP | 2013095280 A | 5/2013 |
| JP | 5408920 B2 | 2/2014 |

OTHER PUBLICATIONS

English Machine Translation of JP2013095280A dated May 20, 2013.
English Machine Translation of JP5408920B2 dated Feb. 5, 2014.

*Primary Examiner* — Quan-Zhen Wang
*Assistant Examiner* — Rajsheed O Black-Childress
(74) *Attorney, Agent, or Firm* — David Coppiellie; King & Schickli, PLLC

(57) ABSTRACT

A fuel economy and comfort control apparatus is provided for a motor vehicle. That apparatus includes a plurality of sensors and a controller. The controller is configured to determine and advise an operator of the motor vehicle of the most fuel efficient mode of operating a climate control system of the motor vehicle to maintain occupant comfort while optimizing fuel efficient operation of the motor vehicle. A related method is also disclosed.

15 Claims, 4 Drawing Sheets

(56) References Cited

U.S. PATENT DOCUMENTS

| | | |
|---|---|---|
| 9,645,970 B2 | 5/2017 | Boesch et al. |
| 9,682,609 B1 | 6/2017 | Dudar |
| 2009/0031741 A1 | 2/2009 | Hara et al. |
| 2011/0040438 A1* | 2/2011 | Kluge ................ G01C 21/3469 701/31.4 |
| 2015/0258996 A1 | 9/2015 | Victor et al. |
| 2018/0057012 A1 | 3/2018 | Delgado et al. |
| 2018/0194361 A1 | 7/2018 | Dudar |

* cited by examiner

APPARATUS AND METHOD FOR PROVIDING CLIMATE AND COMFORT CONTROL WHILE OPTIMIZING THE FUEL ECONOMY OF A MOTOR VEHICLE

TECHNICAL FIELD

This document relates generally to the motor vehicle equipment field and, more particularly, to a new and improved method and apparatus for optimizing climate and comfort control for occupants of a motor vehicle while simultaneously optimizing the fuel economy of the motor vehicle.

BACKGROUND

Climate and comfort control and fuel economy are critical considerations when operating a motor vehicle. In many instances the motor vehicle operator is faced with the choice of opening one or more closures of the motor vehicle to provide for the free flow of ambient air through the passenger cabin of the motor vehicle or closing the closures of the motor vehicle and activating the air conditioning system of the motor vehicle to provide dehumidified and cool air to the passenger compartment. Significantly, either of these options has a negative impact on the fuel economy of the motor vehicle. More specifically, when closures are opened, drag is created and the resulting aerodynamic losses reduce fuel economy. When the air conditioning system is operated, power is drawn from the drive motor to operate the compressor of the air conditioning system thereby reducing fuel economy. Under certain operating conditions the opening of the closure has a greater negative impact on fuel economy than the operating of the air conditioning system. Under other operating conditions, the operation of the air conditioning system has a greater negative impact on fuel economy than the opening of the closures. The crossover point at which the opening of the closures has a greater negative impact on the fuel economy of the motor vehicle than the operating of the air conditioning system has varies depending on the make and model of the motor vehicle. Without guidance, the motor vehicle operator has no way of knowing which option is the better choice when seeking to maintain comfort while also maximizing or optimizing fuel economy.

This document relates to a new and improved apparatus and method that effectively coaches the motor vehicle operator in a manner that allows the operator to maintain comfort while optimizing or maximizing fuel economy. Further, the apparatus and method provide a scoring system that will help the motor vehicle operator achieve these goals under substantially any foreseeable operating conditions that might be encountered during the day-to-day operation of the motor vehicle.

SUMMARY

In accordance with the purposes and benefits as described herein, a new and improved fuel economy and comfort control apparatus is provided for a motor vehicle. That fuel economy and comfort control apparatus comprises a plurality of sensors that provide data to a controller configured to determine and advise an operator of the motor vehicle of the most fuel efficient mode of operating a climate control system of the motor vehicle to maintain occupant comfort while optimizing fuel efficient operation of the motor vehicle. The plurality of sensors may include an engine speed sensor, a motor vehicle speed sensor, an outside ambient temperature sensor and a closure position sensor. The controller determines and advises the operator of the motor vehicle of the most fuel efficient mode of operating the climate control system to maintain occupant comfort while optimizing fuel efficient operation in response to (a) engine speed data, motor vehicle speed data, outside ambient temperature data and exterior closure position data received from the plurality of sensors and (b) a fuel economy map database for the motor vehicle. That fuel economy map database is unique to the particular make and model of the motor vehicle.

The controller may include at least one processor, at least one memory, and at least one human interface. Further, the controller may include a speech processor.

The fuel economy map database may include any data useful for determining how to operate the climate control system of the motor vehicle to maintain occupant comfort while also optimizing fuel efficient operation of the motor vehicle. Toward this end the fuel economy map database may include data selected from a group of data fields consisting of vehicle standard aerodynamic drag coefficient, vehicle frontal area, vehicle non-standard aerodynamic drag coefficient, vehicle tire rolling resistance coefficients, vehicle parasitic losses in driveline, climate control compressor displacement and pulley ratio, climate control belt efficiency, climate control condenser front end recirculation temperature and combinations thereof.

The closure position system may monitor closure position of all opening exterior closures of the motor vehicle including any windows and a sunroof if the motor vehicle is so equipped. The non-standard drag coefficient data in the fuel economy map database provides appropriate data for any combination of open exterior closures and closed exterior closures for the motor vehicle.

The controller may be further configured to provide a scoring system indicating the extent to which the operator has followed recommendations of the fuel economy and comfort control apparatus to improve fuel economy.

In accordance with an additional aspect, a new and improved method of optimizing comfort control and fuel economy is provided. That method comprises the steps of: (a) monitoring, by a plurality of sensors, engine speed, motor vehicle speed, outside ambient temperature and exterior closure position, (b) storing, by a controller, a fuel economy map database, (c) determining, by the controller, a most fuel efficient mode of operating a climate control system of the motor vehicle to maintain occupant comfort while optimizing fuel efficient operation of the motor vehicle in response to engine speed data, motor vehicle speed data, outside ambient temperature data and exterior closure position data as well as the fuel economy map database for the motor vehicle and (d) the advising, by the controller, an operator of the motor vehicle of the most fuel efficient mode of operating the climate control system of the motor vehicle to maintain occupant comfort while optimizing fuel efficient operation of the motor vehicle.

The method may further include the step of incorporating into the fuel economy map, a group of data fields consisting of vehicle standard aerodynamic drag coefficient, vehicle frontal area, vehicle non-standard aerodynamic drag coefficient, vehicle tire rolling resistance coefficients, vehicle parasitic losses in driveline, climate control compressor displacement and pulley ratio, climate control belt efficiency, climate control condenser front end recirculation temperature and combinations thereof. In other embodiments, the method may include incorporating into the fuel economy map a group of data fields consisting of vehicle standard aerodynamic drag coefficient, vehicle non-standard aerodynamic drag coefficient and vehicle tire rolling resistance coefficients.

In any of the these embodiments the method may further include incorporating non-standard aerodynamic drag coefficient data for any combination of open exterior closures and closed exterior closures for the motor vehicle.

Still further the method may include the step of providing, by the controller, a scoring system indicating an extent to which the operator has followed recommendations of the controller to improve fuel economy. Further, the method may include awarding, by the controller, points for (a) following the recommendations and (b) a lapsed time before following the recommendations.

In the following description, there are shown and described several preferred embodiments of the fuel economy and comfort control apparatus and the related method. As it should be realized, the apparatus and method are capable of other, different embodiments and their several details are capable of modification in various, obvious aspects all without departing from the apparatus and method set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method and together with the description serve to explain certain principles thereof.

Reference will now be made in detail to the present preferred embodiments of the apparatus and method, examples of which are illustrated in the accompanying drawing figures.

DETAILED DESCRIPTION

Figure 1:
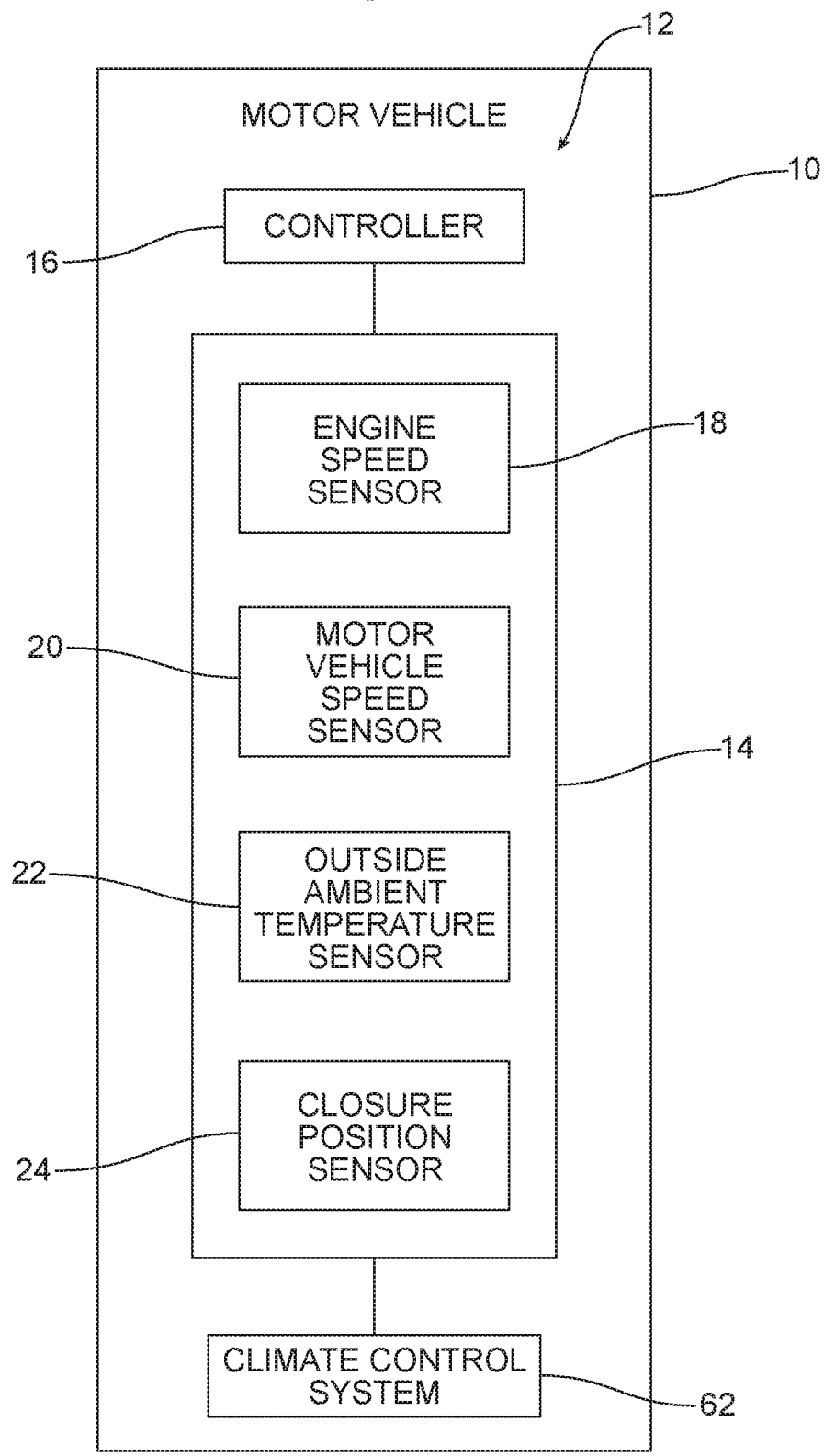
FIG. 1 is a schematic block diagram of the fuel economy and comfort control apparatus.

Reference is now made to FIG. 1 which schematically illustrates a motor vehicle 10 equipped with the new fuel economy and comfort control apparatus 12. That fuel economy and comfort control apparatus 12 includes a plurality of sensors 14 and a cooperating controller 16. In the illustrated embodiment, the plurality of sensors 14 includes an engine speed sensor 18, a motor vehicle speed sensor 20, an outside ambient temperature sensor 22 and a closure position sensor 24.

The controller 16 may be a computing device such as a dedicated microprocessor or an electronic control unit (ECU) operating in accordance with instructions from appropriate control software. As best illustrated in FIG. 2, the controller 16 may include one or more processors such as the main processor 26, one or more memories 28, and one or more network interfaces 30 that communicate with each other over a communication bus 32.

Figure 2:
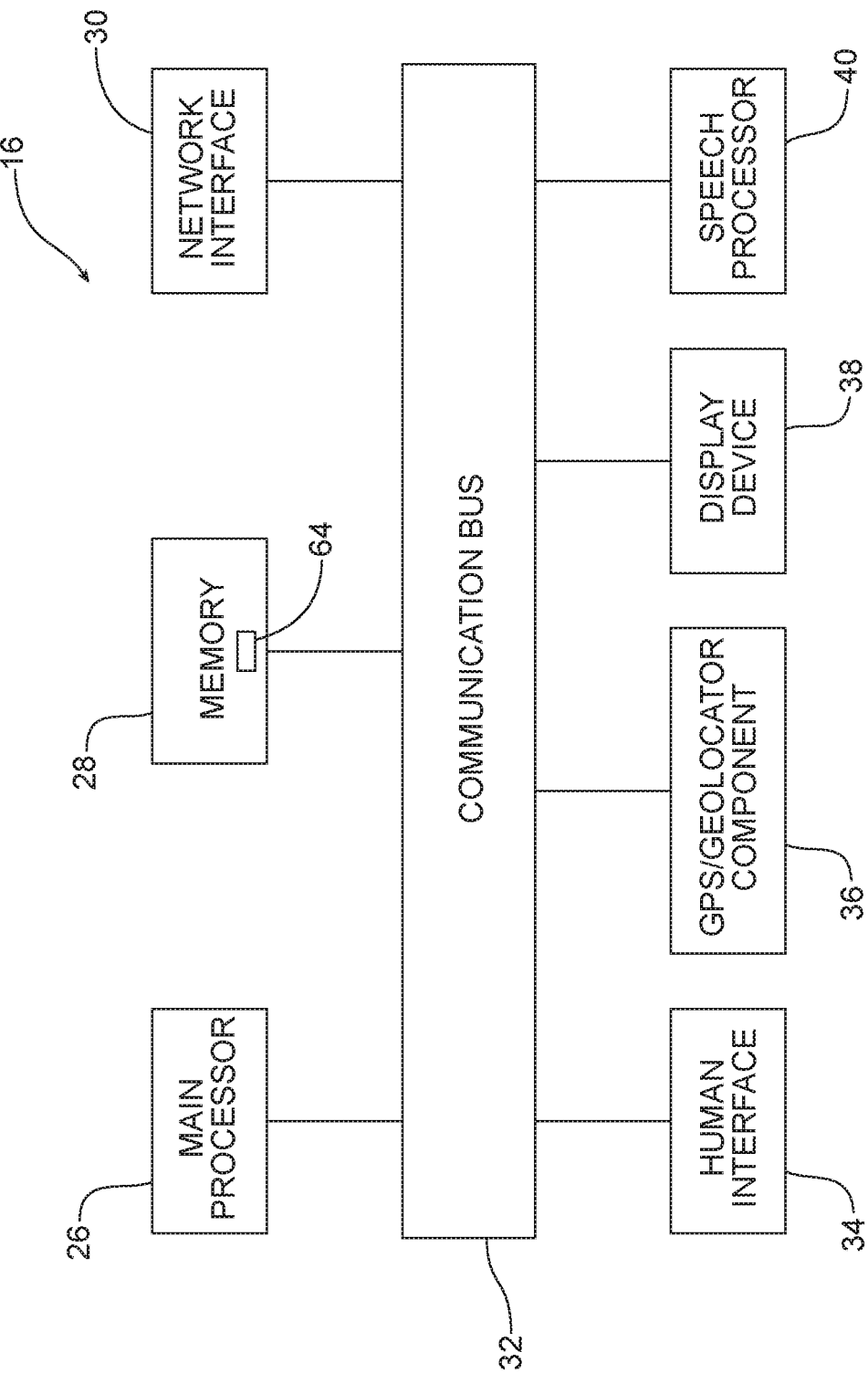
FIG. 2 is a schematic block diagram of the controller for the fuel economy and comfort control apparatus illustrated in FIG. 1.

As further illustrated in FIG. 2, the controller 16 may include a human interface 34, such as a keyboard, pushbutton control panel or touchscreen. The controller 16 may also include a GPS/Geolocator component 36 for determining the precise location of the motor vehicle at any particular moment in time. The controller 16 may also include a display device 38 to display data, motor vehicle operating recommendations and scores or point awards in a manner described in greater detail below. Further, the controller 16 may include a speech processor 40 to provide audio communication with the motor vehicle operator and allow for voice commands from the motor vehicle operator.

Figure 3:
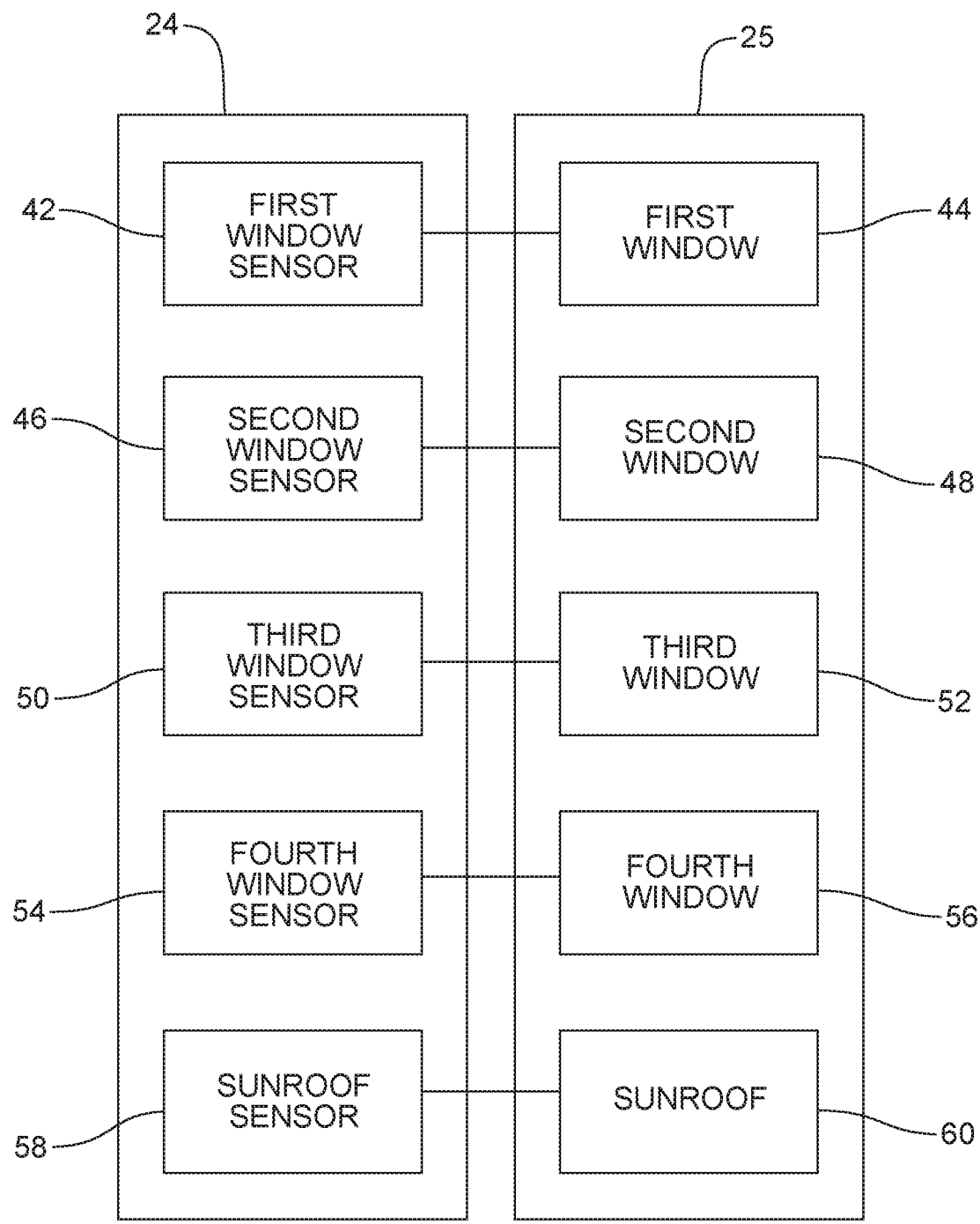
FIG. 3 is a schematic block diagram of one potential embodiment of the closure position sensor of the fuel economy and comfort control apparatus illustrated in FIG. 1.

As illustrated in FIG. 3, in one possible embodiment of the fuel economy and comfort control apparatus 12, the closure position sensor 24 may comprise: a first window sensor 42 adapted to monitor the position of a first window 44, a second window sensor 46 adapted to monitor the position of a second window 48, a third window sensor 50 adapted to monitor the position of a third window 52, a fourth window sensor 54 adapted to monitor the position of a fourth window 56 and sunroof sensor 58 adapted to monitor the position of a sunroof 60 of the motor vehicle 10. The first window 44, the second window 48, the third window 52, the fourth window 56 and the sunroof 60 may be collectively referred to as the exterior closures 25. The engine speed sensor 18, motor vehicle speed sensor 20, outside ambient temperature sensor 22 and closure position sensor 24, including the first window sensor 42, the second window sensor 46, the third window sensor 50, the fourth window sensor 54 and the sunroof sensor 58, may all be of a type known in the art.

The controller 16 may be adapted to continuously monitor the live data provided from the plurality of sensors 14 either directly or from another control module such as the vehicle control module (VCM), control module (PCM) or body control module (BCM). For example, the variables monitored by the plurality of sensors 14 may be monitored by the controller at a rate of 1 Hz or faster, depending upon hardware capability as those variables are the final inputs for the controller 16 to select the appropriate fuel economy setting from the fuel economy map database 64.

The controller 16 is configured to determine and advise an operator of the motor vehicle 10 of the most fuel efficient mode of operating the climate control system 62 (a.k.a. heating, ventilation and air conditioning (HVAC) system) of the motor vehicle in order to maintain occupant comfort while simultaneously optimizing fuel efficient operation of the motor vehicle in response to (a) engine speed data received from the engine speed sensor 18, motor vehicle speed data received from the motor vehicle speed sensor 20, outside ambient temperature data received from the outside ambient temperature sensor 22 and exterior closure position data received from the closure position sensor 24 and (b) a fuel economy map database 64 for the motor vehicle. As illustrated in FIG. 2, that fuel economy map database 64 is maintained in the memory 28 of the controller.

For purposes of this document, "fuel economy map database" includes engineering data from the development phase of the motor vehicle. The fuel economy database includes a condensed data set incorporating all the data needed to allow the controller 16 to select the most fuel efficient fuel economy settings while maintaining optimum occupant comfort.

Significantly, the fuel economy map database 64 is matched to the particular make and model of the motor vehicle 10.

In one possible embodiment, the fuel economy map database includes vehicle standard aerodynamic drag coefficient data, vehicle non-standard aerodynamic drag coefficient data and vehicle frontal tire rolling resistance coefficients data. In another possible embodiment of the fuel economy and comfort control apparatus 12, the fuel economy map database 64 includes data selected from a group of data fields consisting of vehicle standard aerodynamic drag coefficient data, vehicle frontal area data, vehicle non-standard aerodynamic drag coefficient data, vehicle tire rolling resistance coefficients data, vehicle parasitic losses and driveline data, climate control compressor displacement and pulley ratio data, climate control belt efficiency data, climate control condenser front end recirculation temperature data and combinations thereof.

As should be appreciated, the closure position sensor 24 includes the window sensors 42, 46, 50 and 54 for monitoring the respective position of the windows 44, 48, 52, and the sunroof sensor 58 for monitoring the position of the sunroof 60. The vehicle non-standard aerodynamic drag coefficient data included in the fuel economy map database provides aerodynamic drag coefficient data for any combination of open exterior closures 44, 48, 52, 56, 60 and closed exterior closures for the motor vehicle 10.

The controller 16 of the fuel economy and comfort control apparatus 12 may be further adapted or configured to provide a scoring system indicating an extent to which the operator has followed recommendations of the controller 16/fuel economy and comfort control apparatus 12 in order to improve fuel economy. An infinite number of different scoring systems may be utilized. In one possible embodiment, the grading system may consist of a scale from 0 to 1. A grade of "1" is given if the driver follows the recommendation of the fuel economy and comfort control apparatus 12. A grade of "0" is given if the driver does not follow the recommendation.

In addition, a score is given for the driver's reaction speed based upon the time difference between the recommendation being given by the fuel economy and comfort control apparatus 12 and the driver's decision to take action, if any. A standard 5-10 second window may be used for the fuel economy and comfort control apparatus 12 to sense that the driver has reacted to the recommendation. After the ten second window, the system automatically grades based upon the first grading criteria. The final grade will be a skewed average between the two grades. The driver's decision whether or not to follow the recommendation will represent the largest portion of the overall grade (perhaps 80% or more) while the speed of reaction will account for the remainder.

Consistent with the above description, the fuel economy and comfort control apparatus 12 functions to provide a method of optimizing comfort control and fuel economy for the motor vehicle 10. That method may be broadly described as comprising the steps of: (a) monitoring, by a plurality of sensors 14, engine speed, motor vehicle speed, outside ambient temperature and exterior closure position, (b) storing, by the controller 16 a fuel economy map database 64, (c) determining, by the controller, a most fuel efficient mode of operating the climate control system 62 of the motor vehicle 10 in order to maintain occupant comfort while optimizing fuel efficient operation of the motor vehicle in response to engine speed data from the engine speed sensor 18, motor vehicle speed data from the motor vehicle speed sensor 20, outside ambient temperature data from the outside ambient temperature sensor 22 and exterior closure position data from the closure position sensor 24 as well as the fuel economy map database and (d) advising, by the controller, the operator of the motor vehicle of the most fuel efficient mode of operating the climate control system of the motor vehicle to maintain occupant comfort while optimizing fuel efficient operation of the motor vehicle.

Toward this end the method may further include the step of incorporating into the fuel economy map 64 a group of data fields consisting of the vehicle standard aerodynamic drag coefficient data, vehicle non-standard aerodynamic drag coefficient data and vehicle tire rolling resistance coefficients data. In other possible embodiments the method may include incorporating into the fuel economy map 64 a group of data fields consisting of vehicle standard aerodynamic drag coefficient data, vehicle frontal area data, vehicle non-standard aerodynamic drag coefficient data, vehicle tire rolling resistance coefficient data, vehicle parasitic losses in driveline data, climate control compressor displacement and pulley ratio data, climate control belt efficiency data, climate control condenser front end recirculation temperature data and combinations thereof. For purposes of this document, vehicle tire rolling resistance coefficients data may include data for various tires from different manufacturers with different diameters and widths and at different tire pressures.

In any of the many possible embodiments, the non-standard aerodynamic drag coefficient data may be for any combination of open exterior closures and closed exterior closures 25. Thus the method may also include the step of accounting for all open windows and an open sunroof of the motor vehicle in the non-standard drag coefficient data.

Still further the method may include the step of providing, by the controller 16, a scoring system indicating an extent to which the operator of the motor vehicle has followed recommendations of the controller 16/fuel economy and comfort control apparatus 12. Further, the method may include awarding, by the controller 16, points for (a) following these recommendations and (b) elapsed time before following these recommendations.

Figure 4:
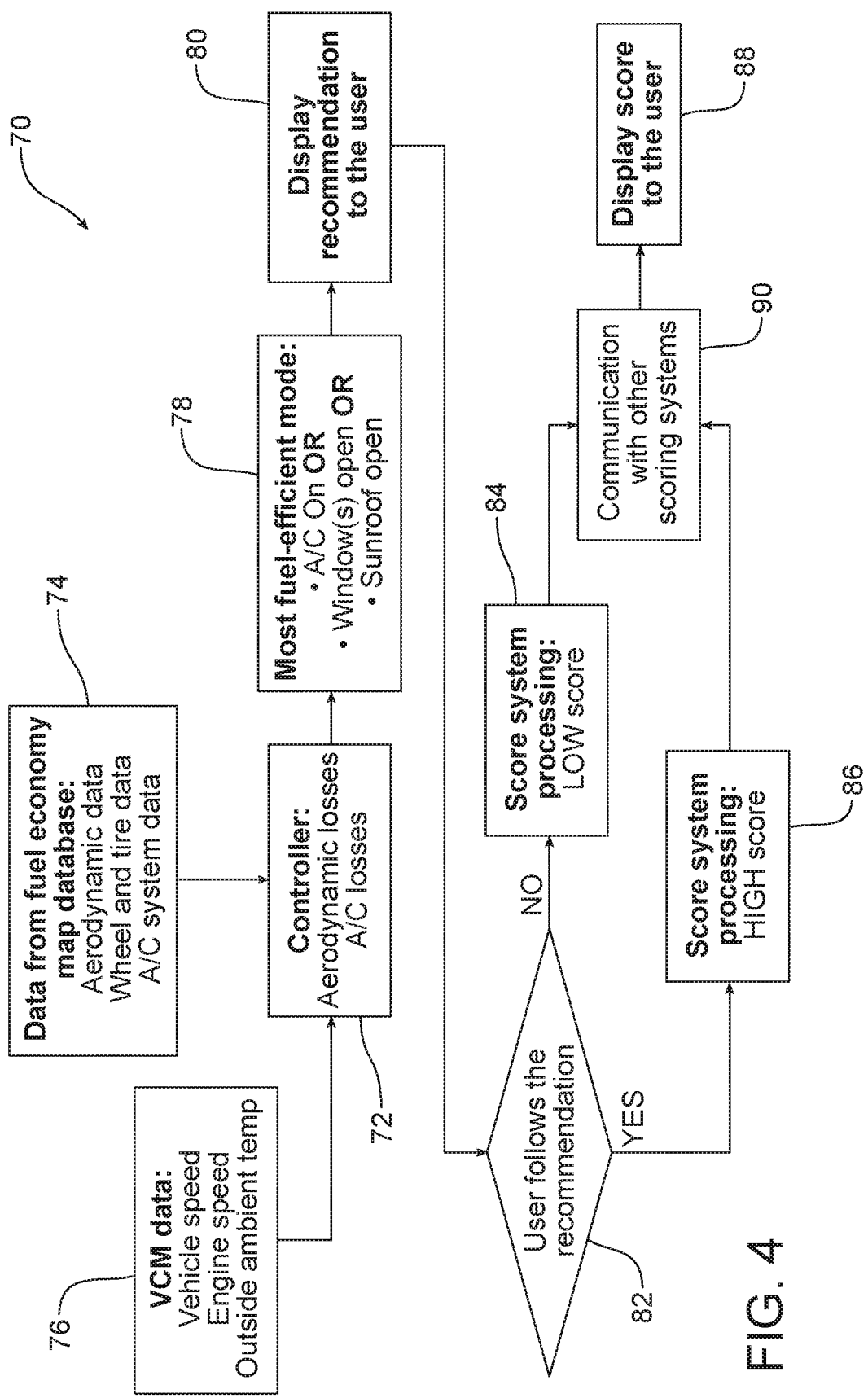
FIG. 4 is one possible control logic flow diagram for the fuel economy and comfort control apparatus and the related method.

Reference is now made to FIG. 4 illustrating one possible control logic flow diagram 70 for the fuel economy and comfort control apparatus 12. At box 72 the controller 16 uses data from the fuel economy map database 64 in the memory 28 (box 74) and engine speed data, motor vehicle speed data, outside ambient temperature data, enclosure position sensor data from the plurality of sensors 14 (box 76) to determine relevant aerodynamic losses and air conditioning system losses. Next is the step of determining the most fuel efficient mode of operation for the motor vehicle 10 at box 78. That is either opening the windows alone, opening the windows and the sunroof together, opening the sunroof alone or closing the windows and the sunroof and activating the climate control system 62 with air conditioning.

The controller then advises the motor vehicle operator of a recommendation for the most fuel efficient mode at box 80. This may be done in any number of ways including visually at the human interface 34 or display device 38 and/or audibly through the speech processor 40. It is then up to the user of the motor vehicle operator to follow the recommendation at box 82. If the operator does not follow the recommendation, the controller 16 awards a low score through the scoring system at box 84. However, if the operator does follow the recommendation, the controller 16 awards a high score at the box 86. That high score may include points for both following the recommendation and elapsed time before following the recommendation. The shorter period of time for following the recommendation, the higher score awarded. The controller 16 then advises the motor vehicle operator of the score at box 88. This may be done visually at the human interface 34 or the display device 38 and/or audibly by the speech processor 40.

In one possible embodiment of the fuel economy and comfort control apparatus 12, the controller 16 may communicate with other scoring systems of the motor vehicle (see box 90) before awarding the score at box 88. Such additional scoring systems may include, for example, the Ford Eco Coach scoring system which scores other driver actions such as gear shifting, acceleration, deceleration or coast downs and the like.

The foregoing has been presented for purposes of illustration and description. It is not intended to be exhaustive or to limit the embodiments to the precise form disclosed. Obvious modifications and variations are possible in light of the above teachings. For example, while the embodiment of the fuel economy and comfort control apparatus 12 illustrated in FIG. 3 relates to a four door, four window motor vehicle equipped with a sunroof, the fuel economy and comfort control apparatus may also be configured for other vehicles including vehicles with and without a sunroof, such as a convertible. All such modifications and variations are within the scope of the appended claims when interpreted in accordance with the breadth to which they are fairly, legally and equitably entitled.

What is claimed:

1. A fuel economy and comfort control apparatus for a motor vehicle, comprising:
   a plurality of sensors including an engine speed sensor, a motor vehicle speed sensor, an outside ambient temperature sensor and a closure position sensor; and
   a controller configured to determine and advise an operator of said motor vehicle of most fuel-efficient mode of operating a climate control system of said motor vehicle to maintain occupant comfort while optimizing fuel-efficient operation of said motor vehicle in response to (a) engine speed data, motor vehicle speed data, outside ambient temperature data and exterior closure position data received from said plurality of sensors and (b) a fuel economy map database for said motor vehicle wherein said fuel economy map database includes data selected from a group of data fields consisting of vehicle standard aerodynamic drag coefficient, vehicle frontal area, vehicle non-standard aerodynamic drag coefficient, vehicle tire rolling resistance coefficients, vehicle parasitic losses in driveline, climate control compressor displacement and pulley ratio, climate control belt efficiency, climate control condenser front end recirculation temperature and combinations thereof.

2. The fuel economy and comfort control apparatus of claim 1, wherein said controller includes at least one processor, at least one memory and at least one human interface.

3. The fuel economy and comfort control apparatus of claim 2, wherein said controller includes a speech processor.

4. The fuel economy and comfort control apparatus of claim 1, wherein said fuel economy map database is (a) matched to a make and model of said motor vehicle and (b) stored in said memory.

5. The fuel economy and comfort control apparatus of claim 4, wherein said closure position sensor monitors closure position of all opening exterior closures of said motor vehicle including any windows and a sunroof.

6. The fuel economy and comfort control apparatus of claim 5, wherein said controller is further configured to provide a scoring system indicating an extent to which said operator has followed recommendations of said fuel economy and comfort control apparatus to improve fuel economy.

7. A method of optimizing comfort, control and fuel economy of a motor vehicle, comprising:
   monitoring, by a plurality of sensors, engine speed, motor vehicle speed, outside ambient temperature and exterior closure position;
   storing, by controller, a fuel economy map database;
   determining, by said controller, a most fuel-efficient mode of operating a climate control system of said motor vehicle to maintain occupant comfort while optimizing fuel-efficient operation of said motor vehicle in response to (a) engine speed data, motor vehicle speed data, outside ambient temperature data and exterior closure position data and (b) said fuel economy map database for said motor vehicle;
   advising, by said controller, an operator of said motor vehicle of most fuel-efficient mode of operating a climate control system of said motor vehicle to maintain occupant comfort while optimizing fuel-efficient operation of said motor vehicle; and
   incorporating into said fuel economy map a group of data fields consisting of vehicle standard aerodynamic drag coefficient, vehicle frontal area, vehicle non-standard aerodynamic drag coefficient, vehicle tire rolling resistance coefficients, vehicle parasitic losses in driveline, climate control compressor displacement and pulley ratio, climate control belt efficiency, climate control condenser front end recirculation temperature and combinations thereof.

8. The method of claim 7, further including incorporating non-standard aerodynamic drag coefficient data for any combination of open exterior closures and closed exterior closures for said motor vehicle.

9. The method of claim 8, further including providing, by said controller, a scoring system indicating an extent to which said operator has followed recommendations of said controller to improve fuel economy.

10. The method of claim 9, further including awarding, by said controller, points for (a) following said recommendations and (b) elapsed time before following said recommendations.

11. The method of claim 7, including accounting for all opening windows and an opening sunroof of said motor vehicle in said non-standard drag coefficient data.

12. The method of claim 7, further including incorporating non-standard aerodynamic drag coefficient data for any combination of open exterior closures and closed exterior closures for said motor vehicle.

13. The method of claim 12, including accounting for all opening windows and an opening sunroof of said motor vehicle in said non-standard drag coefficient data.

14. The method of claim 12, further including providing, by said controller, a scoring system indicating an extent to which said operator has followed recommendations of said controller to improve fuel economy.

15. The method of claim 14, further including awarding, by said controller, points for (a) following said recommendations and (b) elapsed time before following said recommendations.

* * * * *